(12) United States Patent
Hussain et al.

(10) Patent No.: US 6,647,106 B1
(45) Date of Patent: *Nov. 11, 2003

(54) PRIVACY SCREENING SERVICE WITH A BYPASS CODE

(75) Inventors: Aamir Mahmood Hussain, Atlanta, GA (US); Scott Crandall Holt, Smyrna, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/456,316

(22) Filed: Dec. 8, 1999

(51) Int. Cl.[7] .............................. H04M 3/42; H04M 7/00
(52) U.S. Cl. .............................. 379/207.02; 379/207.11; 379/221.09
(58) Field of Search ..................... 379/201.01–201.05, 379/207.02–207.16, 219, 220.01, 221.08–221.12, 229, 230, 210.02, 211.01, 211.02, 212.01, 142.01–142.05, 32.01, 32.03, 32.04, 352, 395.63

(56) References Cited

U.S. PATENT DOCUMENTS 4,634,811 A * 1/1987 Curtin et al. .......... 379/211.02
5,579,379 A * 11/1996 D'Amico et al. ...... 379/114.01
5,701,301 A   12/1997 Weisser, Jr. ................ 370/428
5,838,774 A   11/1998 Weisser, Jr. .............. 379/92.02

OTHER PUBLICATIONS

Bellcore, "LSSGR: Voiceband Data Transmission Interface Section 6.6 (GR–30–Core)," pp. v–vii, 2-1–2-5; Issue 2, Dec. 1998.

"Selective Call Acceptance" http://www.paulbunyan.net/telephone/rates/features/selectcallaccept.html.

* cited by examiner

Primary Examiner—Benny Tieu
(74) Attorney, Agent, or Firm—Shaw Pittman LLP

(57) ABSTRACT

An advanced intelligent network privacy screening service that allows callers provided with a bypass code to bypass the privacy screening. A termination attempt trigger is provisioned on the subscriber's line at a service switching point. When callers from private or unknown numbers call the subscriber, the call is routed to a service node that plays an announcement to the caller to start the privacy screening process. The caller can then enter the bypass code to bypass the privacy screening. A subscriber to the privacy screening service can change his or her bypass code by calling a system administration number, and entering his or her password and bypass code.

6 Claims, 15 Drawing Sheets

LEGEND:
SS7: SIGNALING SYSTEM 7
SSP: SERVICE SWITCHING POINT
STP: SIGNALING TRANSFER POINT
TAT: TERMINATION ATTEMPT TRIGGER
SN: SERVICE MODE
BRI: BASIC RATE INTERFACE LINE

• • • • • • • SS7 DATA LINKS
———— BRI LINES
– – – – – SUBSCRIBER LINES
━━━━━ VOICE TRUNKS

LEGEND:
SS7: SIGNALING SYSTEM 7
SSP: SERVICE SWITCHING POINT
STP: SIGNALING TRANSFER POINT
TAT: TERMINATION ATTEMPT TRIGGER
SN: SERVICE MODE
BRI: BASIC RATE INTERFACE LINE

LEGEND:
SS7: SIGNALING SYSTEM 7
SSP: SERVICE SWITCHING POINT
STP: SIGNALING TRANSFER POINT
TAT: TERMINATION ATTEMPT TRIGGER
SN: SERVICE MODE
BRI: BASIC RATE INTERFACE LINE

LEGEND:
SS7: SIGNALING SYSTEM 7
SSP: SERVICE SWITCHING POINT
STP: SIGNALING TRANSFER POINT
TAT: TERMINATION ATTEMPT TRIGGER
SN: SERVICE MODE
BRI: BASIC RATE INTERFACE LINE

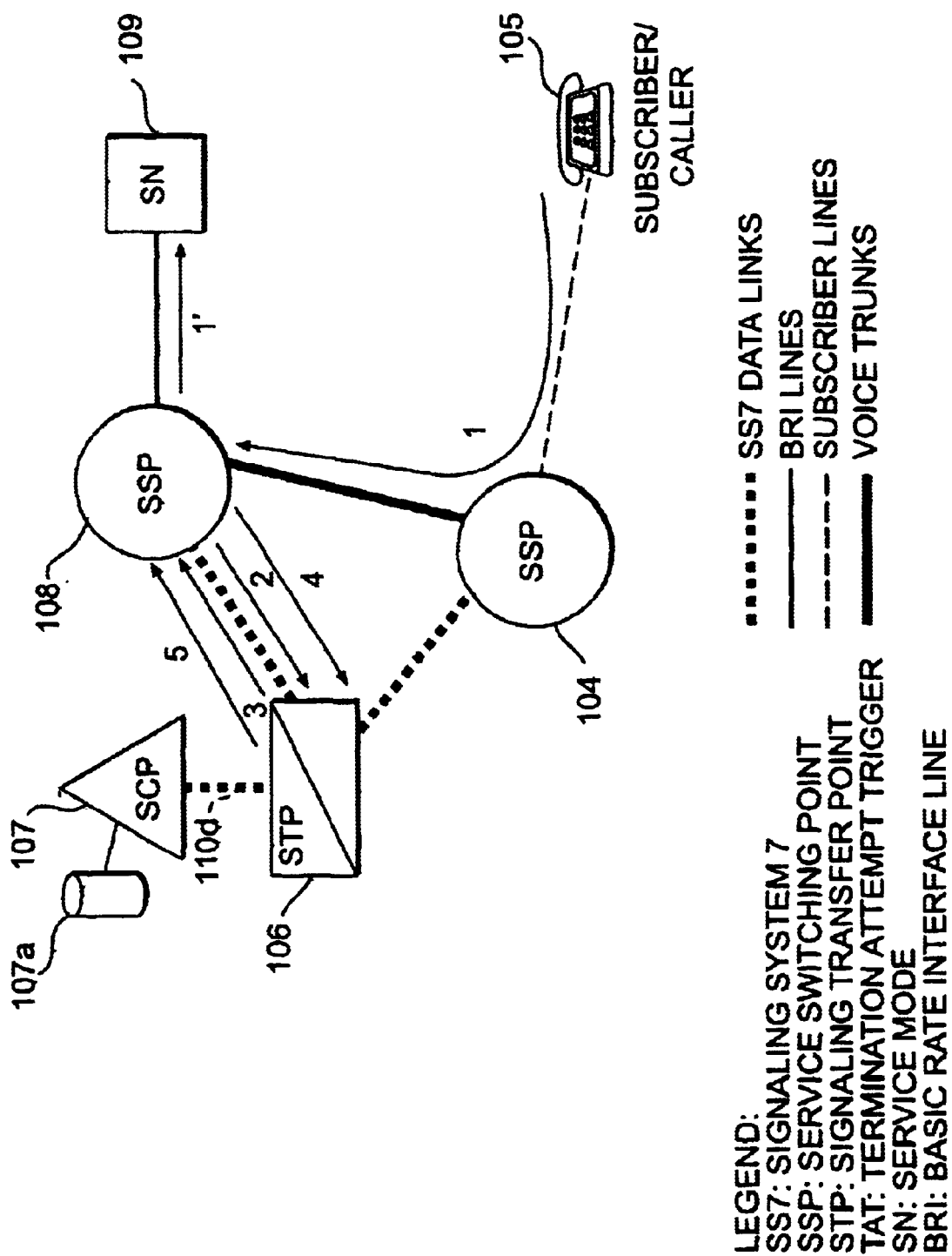

PRIVACY SCREENING SERVICE WITH A BYPASS CODE

BACKGROUND

1. Field of the Invention

The present invention relates to telephone systems that offer privacy screening to their subscribers, and more specifically to allowing certain callers to by-pass the privacy screening.

2. Background of the Invention

A privacy screening service is a service that allows a subscriber to the privacy screening service to screen incoming calls. The privacy screening service provides information to the called party (in this case, the subscriber to the privacy screening service) that allows the subscriber to make an informed decision as whether or not to answer the call. For example, a subscriber may use the privacy screening service to block all unidentified calls from going through. Private telephone numbers are telephone numbers that block services such as "caller ID" that would otherwise identify the caller to the called party. In telephone systems that offer private numbers and a privacy screening service to its customers, calls from a private number to a subscriber with the privacy screening service cannot be completed, unless the caller authorizes the system to override the privacy of his number. Similarly, a call from an unknown number (e.g., a call from outside the telephone network) would not be completed automatically.

FIG. 1 is a schematic diagram showing the basic architecture of an Advanced Intelligent Network telephone system. The Advanced Intelligent Network System is described in U.S. Pat. No. 5,701,301 and U.S. Pat. No. 5,838,774, which are hereby incorporated by reference. FIG. 1 shows the caller's telephone 101 which is connected via the calling party's voice line 102a to its Service Switching Point (SSP) 103. SSP 103 is connected via voice trunk 102b to a second SSP (SSP 104). SSP 104 is the SSP that services the called party's telephone 105. In this example, the called party is a subscriber who has subscribed to the privacy screening service. (The called party will be referred to as the "subscriber" as well as the "called party" herein.) FIG. 1 also shows a Signaling Transfer Point (STP) 106 that services a Service Control Point (SCP) 107 and a third SSP (SSP 108) that services a Service Node (SN) 109. SCP 107 has a database 107a that contains subscriber information.

STP 106 is a signaling hub that routes packets of data over the common channel signaling network. Common channeling signaling networks are data communications networks laid over the system's switching network that carry data and control messages to and from and among the SSPs, STPs, and SCPs in the network. Signaling System 7 (SS7) is the protocol that runs over common channel signaling networks. A common channel signaling network using the Signaling System 7 protocol is often referred to as an SS7 network. The SS7 network carries data and control messages to the SSPs in the telephone network. SCPs are powerful fault-tolerant computers, e.g., AT&T Star Server FT Model 3200 or AT&T Star Server FT Model 3300 computers (these and more current computers such as the Advantage P200 and Advantage 4P200 models are presently available from Lucent Technologies). SCPs are "intelligence centers" with access to applications databases that enable the network to deliver advanced services such as caller ID, privacy screening and call forwarding. The SCPs also execute service package applications (SPAs) that deliver the advanced services. SNs are physically generally similar to SCPs, but include voice and Dual Tone Multi-Frequency (DTMF) signal recognition circuits, voice synthesizers, and voice recognition and digit collection capabilities. The operators of the telephone network can program their SNs to manage data, to respond to calls and to route calls as specified by the telephone network, and to collect digits from a caller or subscriber. The SN's voice circuits can also be programmed to provide a voice response (e.g., to play pre-selected announcements) to callers and to perform voice recognition. SNs can also be programmed to respond to input from the callers by, e.g., further routing the call.

Key components of the AIN, such as the SCPs and STPs are generally provided in redundant pairs, such that the network does not experience an interruption while one of the components is down for repairs or servicing.

As shown in FIG. 1, STP 106 controls communications between SSPs 103, 104 and 108 and SCP 107. The SSPs are connected to the caller's and the subscriber's telephones and to each other via voice lines 102a and 102c and via voice trunks 102b and 102d. The SSPs communicate with STP 106 and SCP 107 via SS7 data links 110a, 110b, 110c and 110d. SN 109 is connected to SSP 108 by an Integrated Service Digital Network (ISDN) Basic Rate Interface (BRI) line 111.

When the caller places a call to the subscriber, the call is routed by SSP 103 to SSP 104. Because the subscriber has subscribed to the privacy screening service, that call (like all calls to that subscriber's number) triggers a "termination attempt trigger" or TAT. In response to the TAT, SSP 104 issues a query. The query goes up to SCP 107 via STP 106 asking for directions as to how the call should be terminated. The query includes the following information: the subscriber's telephone number (in the called party field), the calling party's telephone number (in the calling party field), the calling party's presentation restriction indicator (also in the calling party field) and the trigger criteria type (indicating the service for which the query is intended).

SCP 107 checks the presentation indicator in the calling party number field of the query. If presentation of the caller's number is not restricted, i.e., if the caller's number is public, SCP 107 sends back a response instructing SSP 104 to terminate the call, and to supply the caller's telephone number (and if the subscriber has subscribed to a higher level of service such as caller name delivery—also referred to as caller ID deluxe—the caller's name and telephone number). In that case, SSP 104 terminates the call, i.e., completes the call, supplying the subscriber with the caller's number (and possibly also with the caller's name).

However, if the number of the calling party is unknown, the prior art system asks the calling party to record his or her name before routing the call to the subscriber. Routing the call to the subscriber generally requires a complex sequence of calls, queries and responses, thus burdening the network with additional traffic. Frequent callers, such as the subscriber's close friends or family members (or the subscriber himself or herself, calling home), who call either from private numbers or from unknown numbers, would be unnecessarily screened each time they made calls to the subscriber. Such callers may find the unnecessary delays of having to listen to and respond to the privacy screening announcements very inconvenient.

Furthermore, a separate problem occurs with privacy screening when the subscriber is calling his own number (whether from a public, private or unknown telephone) to check or retrieve messages from his or her answering machine. Because the subscriber is not at home to accept the call, the call does not go through, and the privacy screening service prevents the subscriber from retrieving his or her messages. Privacy screening may also prevent the subscriber from calling home, when calling from a private or unknown telephone.

Privacy screening systems are described in U.S. patent applications Ser. Nos. 09/372,746 and 09/372,676 which are both incorporated herein by reference.

SUMMARY OF THE INVENTION

The present invention is a system and method that allows callers to bypass the subscriber's privacy screening by entering a bypass code, thus avoiding the announcements described above, and allowing the subscriber to retrieve messages from his or her answering machine. The subscriber must provision a password (or personal identification number) and bypass code with the system administration prior to using his or her bypass code.

Bypass Code Call Routing

FIG. 2 is a schematic diagram showing how calls are routed for a first embodiment of the present invention, when the calling party number is private or unknown. When a calling party dials the subscriber's number, the call is routed through the calling party's SSP 103 to the subscriber's SSP 104 (call 1 in FIG. 2). Because the subscriber's number is provisioned with a termination attempt trigger, the call triggers a query from SSP 104 to SCP 107 via STP 106 (query 2 in FIG. 2). SCP 107 checks the presentation indicator in the calling party number field of the query, and determines that the number is either private or unknown. It then sends a response to SSP 104 (response 3), instructing SSP 104 to forward the call to SN 109. SSP 104 then forwards the call (call 4) to SN 109 via the SN's SSP, SSP 108. When SN 109 gets the call, it plays an announcement to the calling party. At this point, a caller provided with a bypass code can enter the bypass code.

Preferably, the caller can enter his or her bypass code at any time after the announcement starts, i.e., the caller can interrupt the announcement. SN 109 collects the digits entered by the calling party (i.e., it collects the bypass code assuming the caller entered the correct bypass code), and then dials a Customized Dialing Plan (CDP) code(e.g., *99) with the called party number, the calling party number, and the digits entered by the caller attached to the CDP code. For example, if the CDP code is *99, and the digits (i.e., the bypass code) entered by the caller is 1234, SN 109 would dial *99 (called party number)(calling party number)1234. The CDP code prompts an Info_Analyzed query from SN 109's SSP (SSP 108) to SCP 107 via STP 106 (query 6 in FIG. 2). SCP 107 then checks its database 107a and confirms that the calling party entered the correct bypass code (i.e., the SCP checks that the entered digits match the subscriber's bypass code), and sends an Analyze_Route response authorizing termination of the call (response 7).

SSP 108 then makes an outbound call (call 8 in FIG. 2), with the calling party's number in the calling party field (as set by this SCP), the subscriber's number in the called party field and the SN's number in the charge number field. This call triggers a second TAT at SSP 104, prompting a query (query 9) from SSP 104 to SCP 107. SCP 107 recognizes the SN's number in the charge number field, and authorizes termination of the call (response 10). The call is then terminated from SSP 104 to the subscriber (call 8'). The SCP does not change the calling party's characteristics, i.e., if the calling party number is included with the CDP code, the SCP will retain the call as "presentation restricted." Otherwise, the calling party number will be all 1's, which would indicate that the call is from an unknown number.

FIG. 3 is a schematic diagram of a second embodiment of the present invention. The second embodiment starts off (like the first embodiment) with the calling party dialing a call from an unknown or private number to the subscriber (call 1 in FIG. 3). Because the subscriber has privacy screening, this call triggers a TAT query from SSP 104 to SCP 107 (query 2 in FIG. 3). In this second embodiment, the SCP responds to the TAT query from SSP 104 (after determining that the calling party is unknown or private) by sending a Send_To_Resource message (response 3 in FIG. 3) to SSP 104, instructing SSP 104 to play an announcement to the calling party, asking the calling party to record his or her name or number. As in the first preferred embodiment, the announcement is interruptible. If the calling party enters digits during the announcement, SSP 104 collects the digits and sends a Resource_Clear query with the digits (i.e., the bypass code if the caller entered the correct bypass code) in the Collected_Digits field to SCP 107 (query 4 in FIG. 3). SCP 107 then checks the entered and collected digits against the bypass code stored in its database. If the calling party entered the correct bypass code (i.e., if SCP 107 determines that the entered and collected digits matches the subscriber's bypass code), SCP 107 sends an Analyze_Route response authorizing termination of the call (response 5 in FIG. 3). The call is then terminated to the subscriber (call 1' in FIG. 3), without any changes to the presentation indicator or to the calling party number.

The second embodiment of the present invention is conceptually simpler, and does not require as many calls and messages to be exchanged as is required by the first embodiment, because SN 109 is never involved in the call routing. The main difference between the first and the second embodiments is that the first embodiment uses the SN to conduct a dialog with the caller, whereas the second embodiment uses the subscriber's SSP to conduct the dialog. Thus, in the second embodiment, each and every SSP in the network must be programmed, whereas in the first embodiment the programming resides in the SNs. Because there are many more SSPs that would have to be programmed than SNs, and because the SSPs may well be provided by different vendors (which would require different programming), and because the operator of the telephone system has full control over the SNs, but must work with its vendors to implement any change in the SSPs, the simplicity advantage of the second embodiment may well be outweighed by the greater ease of implementation of the first embodiment.

A third embodiment of the present invention, like the first embodiment, uses a CDP code to allow a caller from a private or unknown telephone to enter a pass code to bypass privacy screening. This embodiment will be described with reference to FIG. 3a. The call sequence will be described first for calls from private numbers and then for calls from unknown numbers. FIG. 3a applies equally to both calls from private and from unknown callers.

As shown in FIG. 3a, when a calling party dials the subscriber's telephone number, the call (call 1) is routed from the calling party's SSP 103 to the subscriber's SSP 104, prompting a termination attempt query (query 2) to SCP 107. SCP 107 checks the presentation indicator on the calling party number, and discovers that the indicator is "Presentation Restricted", and responds (response 3) by instructing SSP 104 to forward the call (call 4) to SN 109 via SSP 108. SN 109 then plays an announcement to the calling party (through SSPs 108, 104 and 103), asking for permission to present the calling party's telephone number to the subscriber. If the calling party then enters a 4-digit pass code, SN 109 sends a data request to SCP 107 over data link 120 with the subscriber's telephone number, and SCP 107 retrieves the pass code corresponding to the subscriber's telephone number from its database, and sends that pass code to SN 109. Data link 120 is a direct data link, e.g., an X.25 or TCP/IP link between SN 109 and SCP 107. SN 109 checks the pass code received from SCP 107 against the pass code entered by the calling party. If the bypass codes do not match, the call is treated as a normal call from a private telephone number.

If the bypass codes match, SN 109 dials a string starting with a CDP code, e.g., CDP code Y (generally, a two-digit code), followed by the subscriber's number, the calling party number, and, e.g., a five digit string of 2's (22222). The CDP code Y triggers a query, e.g., an Info_Analyzed query (query 5) at the SN's SSP 108. SCP 107 then returns an Analyze_Route message (response 6) with the subscriber's number as the CdPN, and the calling party number as the CgPN. SSP 108 then calls the subscriber with the lead number for the SN (e.g., the SN's multi-line hunt group (MLHG) number) as the charge number (call 7). When the call reaches the subscriber's SSP 104, it prompts a TAT query to SCP 107. SCP 107 recognizes the SN's MLHG number in the charge number field, and responds with an Authorize_Termination message to SSP 104. SSP 104 then terminates the call (call 1') to the subscriber, using the CNAME TR-1188 generic requirements.

FIG. 3a also applies when the caller is calling from an unknown telephone number. In that case, when the termination attempt query (query 2) reaches SCP 107, SCP 107 determines that the calling party number is unavailable. SCP 107 then instructs (response 3) SSP 104 to forward the call (call 4) to SN 109, with the SN's MLHG number in the CdPN field and the calling party number in the CgPN field. SN 109 then plays an announcement to the calling party, asking the calling party to record his or her name. If the caller enters a four-digit pass code, SN 109 sends a data request message to SCP 107 with the subscriber's telephone number over the direct data link 120 between SN 109 and SCP 107. SCP 107 responds to the data request message by retrieving the subscriber's telephone number from the data request, and retrieving the bypass code corresponding to the subscriber's telephone number from its database, and sending that bypass code to SN 109 over data link 120. If SCP 107 cannot find a pass code corresponding to the subscriber's telephone number, it sends a message to SN 109, that it could not find the pass code, and the call is treated as a normal call from an unknown telephone number.

If SCP 107 does find the bypass code, when SN 109 receives the response from SCP 107, it checks the pass code received from SCP 107 against the pass code entered by the calling party. If the pass codes do not match, the call is treated as a normal call from an unknown telephone number.

If the pass codes match, SN 109 then dials a CDP code Y, followed by the 10-digit called party number (the subscriber's number) and, e.g., a 10-digit string of 1's. This ensures that the call will be terminated to the subscriber without any privacy modifications. The call reaches SSP 108 and SN 109 drops out of the call. The CDP code Y triggers a query (query 5) to SCP 107, with Y (e.g., *95) as the Access Code and the rest of the dialed digits in the Collected_Digits field. SCP 107 then analyzes the digits, and returns a response (response 6) with the subscriber's number as the CdPN, and a bogus number (i.e., a number that is not allowed by the telephone network) as the CgPN (with the presentation indicator set to "unavailable").

SSP 108 then calls the subscriber with the subscriber's number in CdPN field, the bogus number in the CgPN field (with the presentation indicator set to "unavailable") and the charge number as the lead number for the SN's MLHG number. When the call (call 7) reaches the subscriber's SSP 104, it hits the TAT provisioned on the subscriber's number at SSP 104. SSP 104 then sends a termination attempt message to SCP 107 with the bogus number as the CgPN (presentation indicator set to unavailable), the subscriber number as the CdPN, and the SN's MLHG number in the charge number field. SCP 107 recognizes the SN's MLHG number in the charge number field, and sends an Authorize_Termination message to SSP 104 with the bogus number in the CgPN and the presentation indicator set to "unavailable." SSP 104 then terminates the call to the subscriber (call 1'), using the CNAME TR-1188 generic requirements.

Provisioning the Bypass Code and Password

The present invention preferably allows a subscriber to access the system administration to change his or her bypass code (including when the subscriber is calling for the first time, to change his or her bypass code from a default bypass code provided by the system).

In a first preferred embodiment for allowing the subscriber to access the system administration, the subscriber is provided with a system administration telephone number, a password or personal identification number (PIN), and a default bypass code. The system administration number is a telephone number at the service node. Thus when the subscriber calls SN 109 using that telephone number, the call is routed from the subscriber through the subscriber's SSP 104 to the SN's SSP 108 (call 1 in FIG. 4a).

The system administration telephone number at SN 109 has a TAT assigned to it. When the call from the subscriber comes in to the SN's SSP 108, the call triggers a TAT query from SSP 108 to SCP 107 via STP 106 (query 2 in FIG. 4a). SCP 107 then checks its database 107a to see if the current call is the first call made by the subscriber to the system administration, e.g., it checks to see if the "first call" flag for that subscriber is still "on." If the first call flag is still on, SCP 107 sends an Authorize_Termination message (response 3) to SSP 108, authorizing termination of the call from the subscriber to a system administration telephone number at SN 109 for first-time callers (e.g., a multi-line hunt group telephone number that services first-time callers to the privacy screening manager at the SN). For first-time callers, the Display_Text field is populated with a default password and passcode, which SN 109 retrieves. SN 109 then verifies the password and passcode entered by the subscriber against the default password and passcode. Once the call reaches SN 109, SN 109 plays a series of announcements for a subscriber calling for the first time, e.g., SN 109 asks the subscriber to enter his or her password and the default bypass code. SN 109 then asks the subscriber to enter a new bypass code (and generally asks the subscriber to also confirm the new bypass code). First-time callers are only allowed to change their pass code and password from their home telephones. The number of the home telephone is obtained by SN 109 from the last re-directing party number.

If the first call flag is not on, SCP 107 sends an Authorize_Termination message to SSP 108 (FIG. 4a also applies in this case—this is response 3 in FIG. 4a), authorizing termination of the call from the subscriber to a system administration telephone number at SN 109 for non-firsttime callers (e.g., a multi-line hunt group telephone number that services non-first-time callers to the privacy screening manager at the SN). The response from SCP 107 also sends the subscriber's bypass code and password to SN 109 in the Display_Text field of its response. Once the call (call 1') reaches SN 109, SN 109 plays an announcement to the caller, asking the caller to enter his or her password and bypass code. SN 109 then compares the password and bypass code received from SCP 107 to the password and bypass code entered by the caller. If the passwords and bypass codes do not match, the caller is given a second opportunity to enter the correct password and bypass code. If the password and bypass code do not match the second time, the call is disconnected.

If the subscriber enters the correct password and bypass code, SN 109 plays an announcement asking the subscriber if he or she would like to change his or her bypass code. If the subscriber indicates that he or she would like to change his or her bypass code, SN 109 collects the changed bypass code from the subscriber through a series of announcements, described below with reference to FIG. 7a. It then dials a CDP code, e.g., *99 followed by the subscriber number, the changed bypass code, and the password. The CDP code triggers an Info_Analyzed query from SSP 108 back up to SCP 107 (query 4), with the subscriber's password and changed bypass code in the collected digits field of the query. SCP 107 receives the changed bypass code, and changes the bypass code for that subscriber in its database 107a. SCP 107 then responds to the query by instructing SSP 108 to disconnect the call (response 5), i.e., by sending a disconnect message to SSP 108.

A second preferred embodiment for allowing the subscriber to access the system administration, uses a PODP (public office dialing plan) trigger provisioned on the SN's SSP to query the SCP's subscriber database. A subscriber who has never provisioned his or her service with a bypass code and password must call the administration system number from his or her home telephone. Subscribers who have already provisioned their bypass code and password may call from any telephone (for example, if they want to change the bypass code).

When the subscriber calls the system administration number (call 1 in FIG. 4b), the PODP trigger provisioned on the SSP serving the system administration (SSP 108) prompts an Info_Analyze query (query 2 in FIG. 4b) to SCP 107. SCP 107 checks that the called party was the system administration, then instructs SSP 108 (response 3 in FIG. 4b) to forward the call to the system administration number (call 4), which is an MLHG that terminates at the SN that holds the privacy director's SPA (service package application). SN 109 checks the called party number, and determines that the call was to the system administration. SN 109 asks the subscriber if he or she is calling from his or her home telephone. If the call is not from the subscriber's home telephone, SN 109 asks the subscriber for his or her home telephone number. SN 109 then retrieves the subscriber's subscription data from SCP 107 (query 5 and response 6 over data link 120), based on the subscriber's number as the calling party number. If there are no subscription data for the subscriber number, the subscriber is asked to call a service representative for assistance. If there are subscriber data for the subscriber number, and the subscriber is calling for the first time, the subscriber is required to provision his or her password and bypass code. If there are subscriber data for the subscriber number, and the subscriber is not calling for the first time, the subscriber is provided with the option of changing his or her password and/or bypass code.

Preferably, data link 120 is an X.25 connection. SN 109 then sends X.25 HB messages to SCP 107 so that SCP 107 can monitor the condition of SN 109. (X.25 HB messages include a mechanism that ensure that there is connectivity between the SN and the SCP.) Data link 120 could also be a TCP/IP connection, as shown on FIG. 4b.

If the subscriber enters an invalid password, SN 109 plays an error announcement. Preferably, the subscriber is only given one second chance to enter the correct password.

The present invention is described herein and shown in the drawings as having one SCP (representing a pair of redundant SCPs) and one SN. However, the present invention could be implemented using more than one SCP and/or SN.

Accordingly, it is an object of the present invention to provide a bypass code that could be used by callers to a subscriber to a privacy screening service that would allow the subscribers to bypass the privacy screening service.

It is another object of the present invention to allow subscribers to a privacy screening service to bypass the privacy screening service when they are calling to check if any messages have been left for them on their answering machines or voicemail.

It is another object of the present invention to minimize the burden on an advanced intelligent network by reducing some of the delays that can occur in calls from private or unknown numbers to subscribers to a privacy screening service.

It is another object of the present invention to provide a subscriber with means for changing his or her bypass code without having to contact a system administrator.

BRIEF DESCRIPTION OF THE DRAWINGS

FIG. 4a is a schematic diagram showing the routing of calls of a first preferred embodiment for allowing a subscriber to change his or her bypass code.

DETAILED DESCRIPTION OF THE INVENTION

The present invention will be described using flow charts describing an implementation of the present invention. It should be understood that these flow charts are examples of how the present invention may be implemented. One of skill in the art would recognize that the present invention may be implemented using variations of the flow charts described herein.

Bypass Code Call Routing

Figure 1:
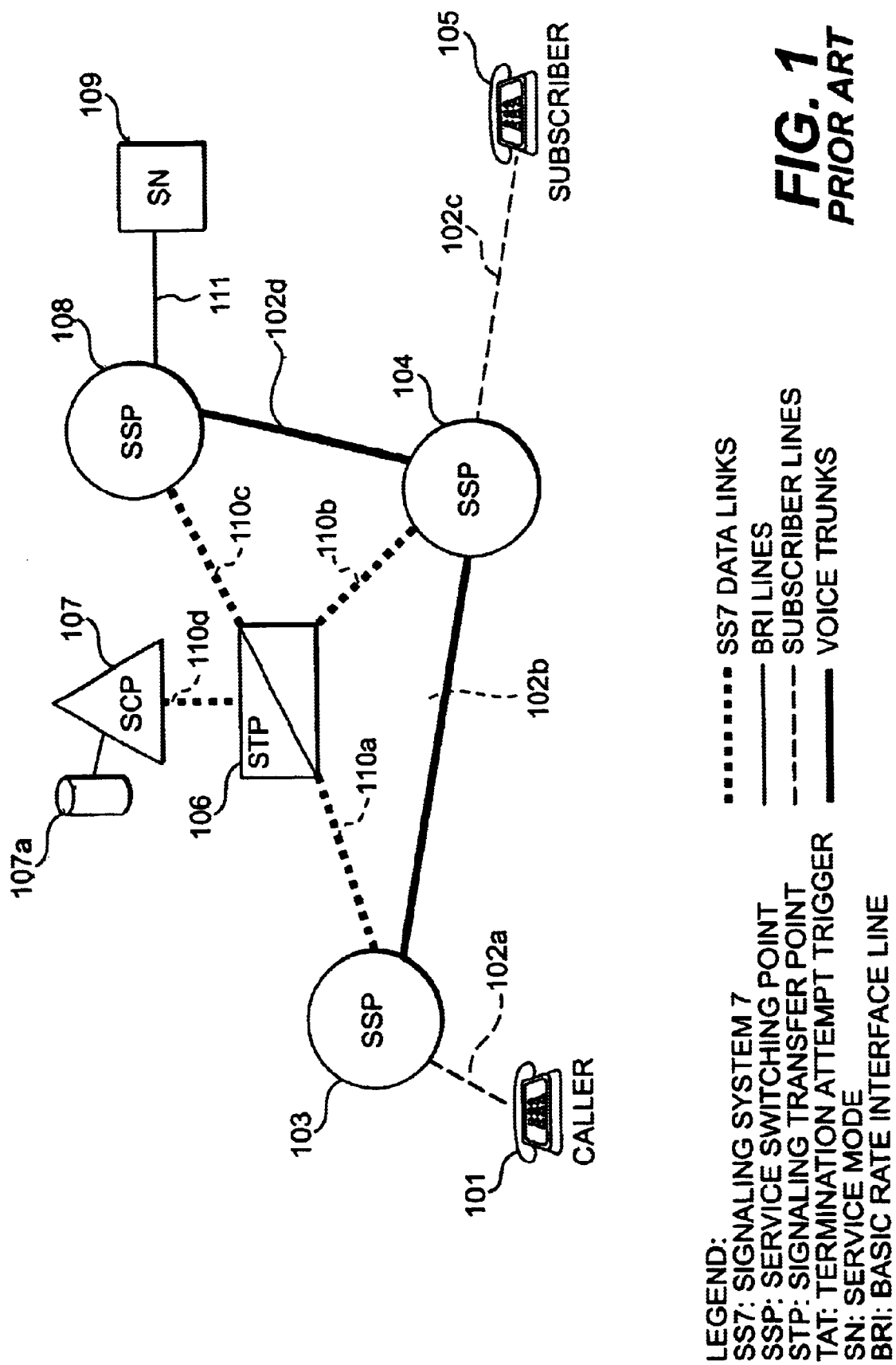
FIG. 1 is a schematic diagram showing the basic architecture of an AIN telephone network.
Figure 2:
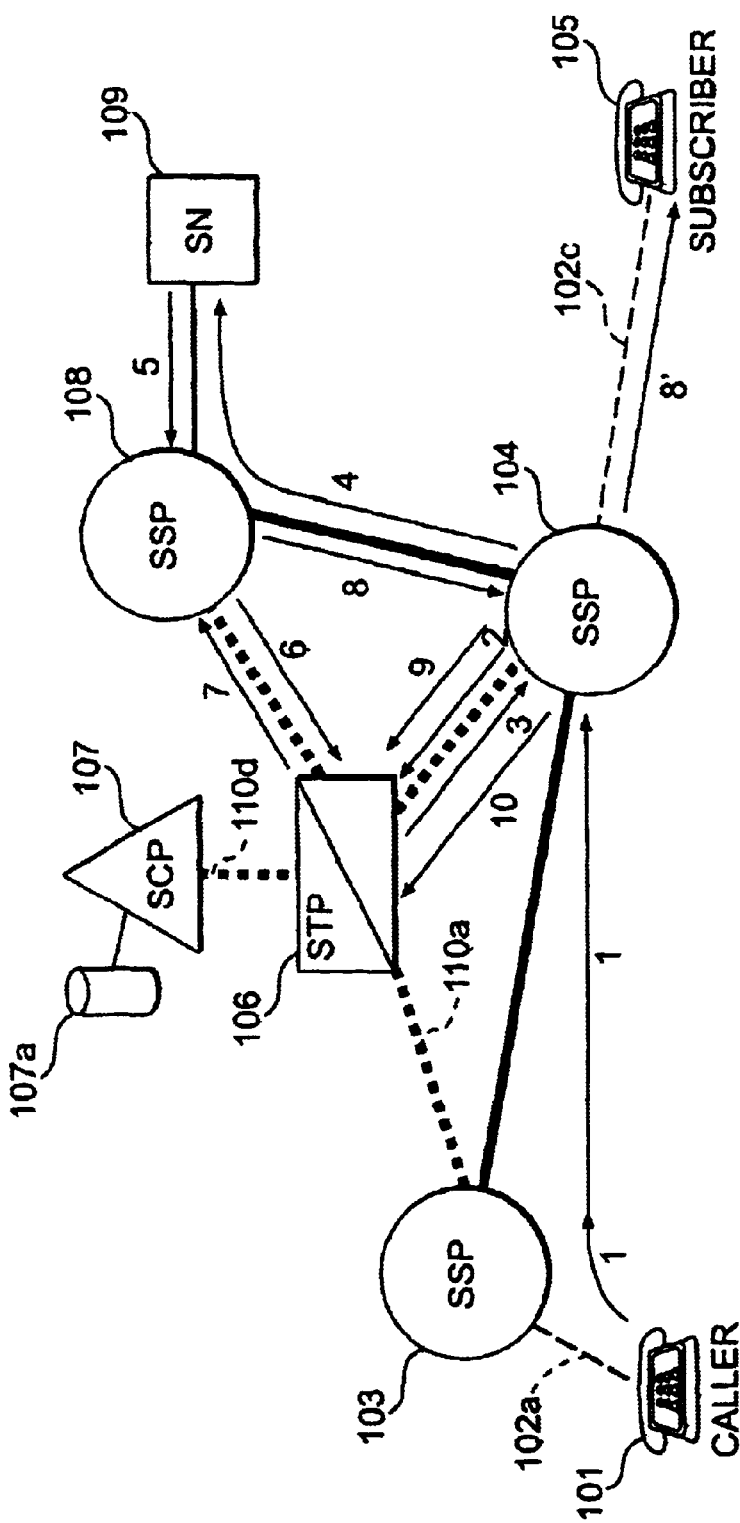
FIG. 2 is a schematic diagram of a first embodiment of the present invention, in which a caller from a private or unknown number bypasses a subscriber's privacy screening using a bypass code.
Figure 5:
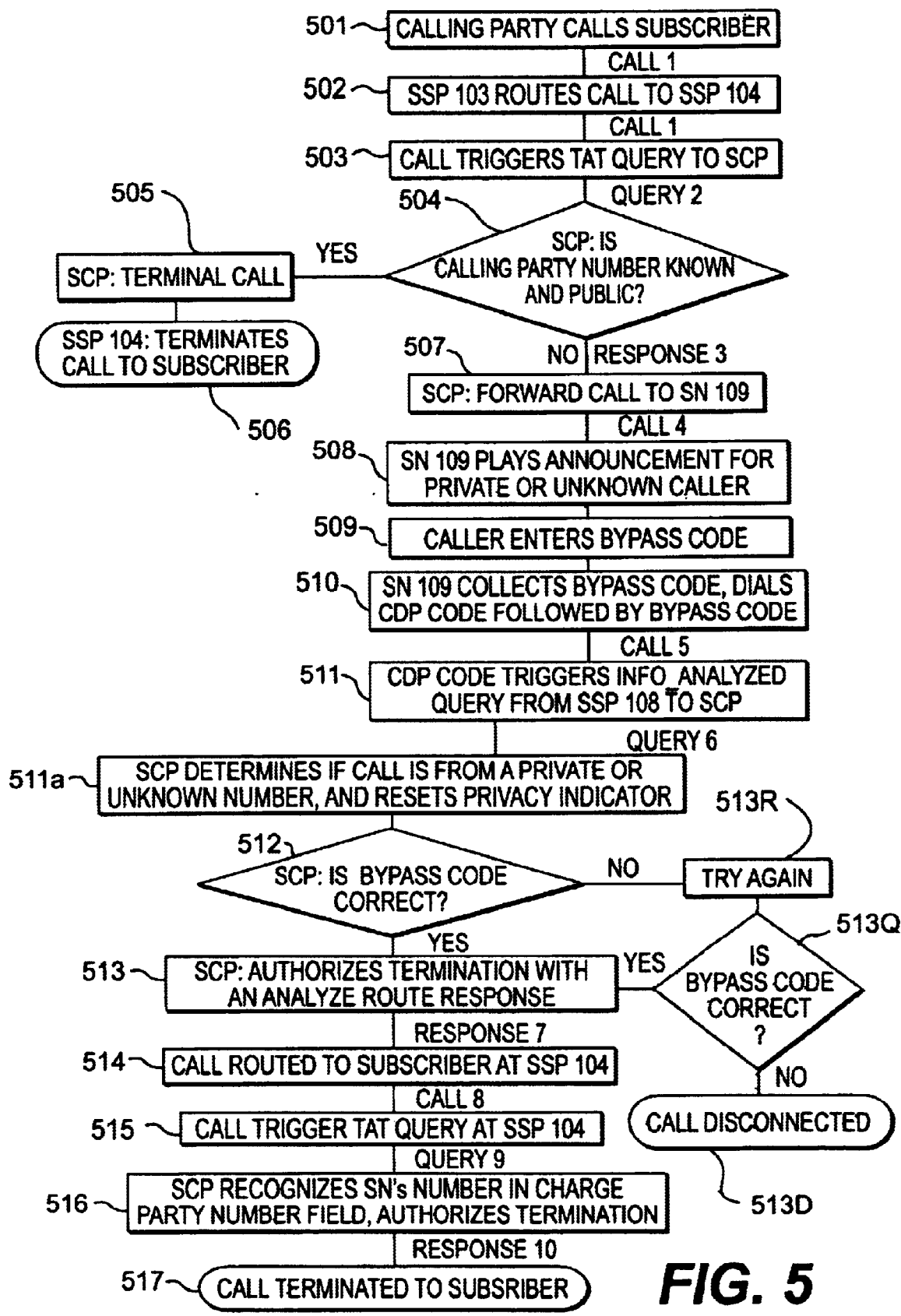
FIG. 5 is a flow chart showing the call flows of the first embodiment of the present invention.

FIG. 5 is a flow chart for the first preferred embodiment of the present invention, showing the call flows when a calling party calls a subscriber to a privacy screening service, and the subscriber has provided the calling party with a bypass code. The call flows listed in FIG. 5 are the call flows identified in FIG. 2. This embodiment uses the service node to conduct the dialog with the caller. In step 501, the calling party dials the subscriber's telephone number. The call (call 1) goes to the calling party's switch, SSP 103. In step 502, SSP 103 routes the call to the subscriber's switch, SSP 104. Because the subscriber has subscribed to a privacy screening service, in step 503 the call triggers a TAT query (query 2) from SSP 104 to SCP 107, asking for authorization to terminate the call. In step 504, SCP 107 checks the presentation indicator in the calling party number field of the query. If the calling party's number is known and public, in step 505 SCP 107 instructs SSP 104 to terminate the call to the subscriber and provides SSP 104 with the name and/or number of the calling party. In step 506 the call goes through to the subscriber, and the subscriber is provided the name and/or number of the calling party. The subscriber can then choose to accept or reject the call. Thus, in this case, because the privacy screening service is not invoked, the call is connected to the subscriber in a routine manner.

If the calling party's number is private or unknown, in step 507 SCP 107 instructs SSP 104 to forward the call to SN 109 via SN 109's switch, SSP 108 (response 3). In step 508, SN 109 plays an announcement to the calling party, e.g., asking the calling party for permission to override his or her privacy (if the calling party number was private) or to record his or her name (if the calling party number was unknown). At anytime during the announcement, in step 509 the calling party enters the bypass code.

In step 510, SN 109 then dials a CDP code with the 10-digit called party number, the 10-digit calling party number and the bypass code attached, e.g., if the CDP code is *99, and the bypass code is 1234, SN 109 would dial *9940455511113016668881234 (call 5), where, for example, 404-555-1111 is the 10-digit called party number and 301-666-8888 is the 10-digit calling party number. When the CDP code reaches SSP 108, in step 511 it triggers an Info_Analyzed query (query 6) from SSP 108 to SCP 107. Query 6 includes the subscriber's (i.e., the called party's number), the calling party's number (or alternatively the number of the SN's multi-line hunt group) and the bypass code in its Collect_Digits field. Upon receiving the query, in step 511a, SCP 107 first determines whether the call was originally from a private or unknown number. If the CgPN is the same as the charge party number, then SCP 107 determines that the call is from an unknown number. If the CgPN is not the same as the charge party number, then SCP 107 determines that the call is from a private number. If the call was from originally from an unknown number, SCP 107 sets the presentation indicator as "unavailable." If the call was from a private number, SCP 107 sets the presentation indicator as "restricted", i.e., private. In step 512, SCP 107 checks its database 107a, and determines whether the correct bypass code was entered. If the correct code was entered, in step 513 SCP 107 sends an Analyze_Route response (response 7), authorizing termination of the call to the subscriber via SSP 104 (call 8). If the entered code is not correct, in step 513R SCP 107 instructs SN 109 to play an announcement asking the caller to try again. In step 513Q, SCP 107 again checks the bypass code. If the caller does not enter the correct bypass code on the second try, the call is disconnected in step 513D. In step 514, the call is routed to the subscriber's SSP, SSP 104 (call 8). In step 515, call 8 triggers a second termination attempt trigger at SSP 104, prompting query 9 to SCP 107. In step 516, SCP 107 recognizes SN 109's number in the charge number field, and authorizes SSP 104 to terminate the call to the subscriber (response 10). In step 517, the call is terminated to the subscriber.

Figure 3:
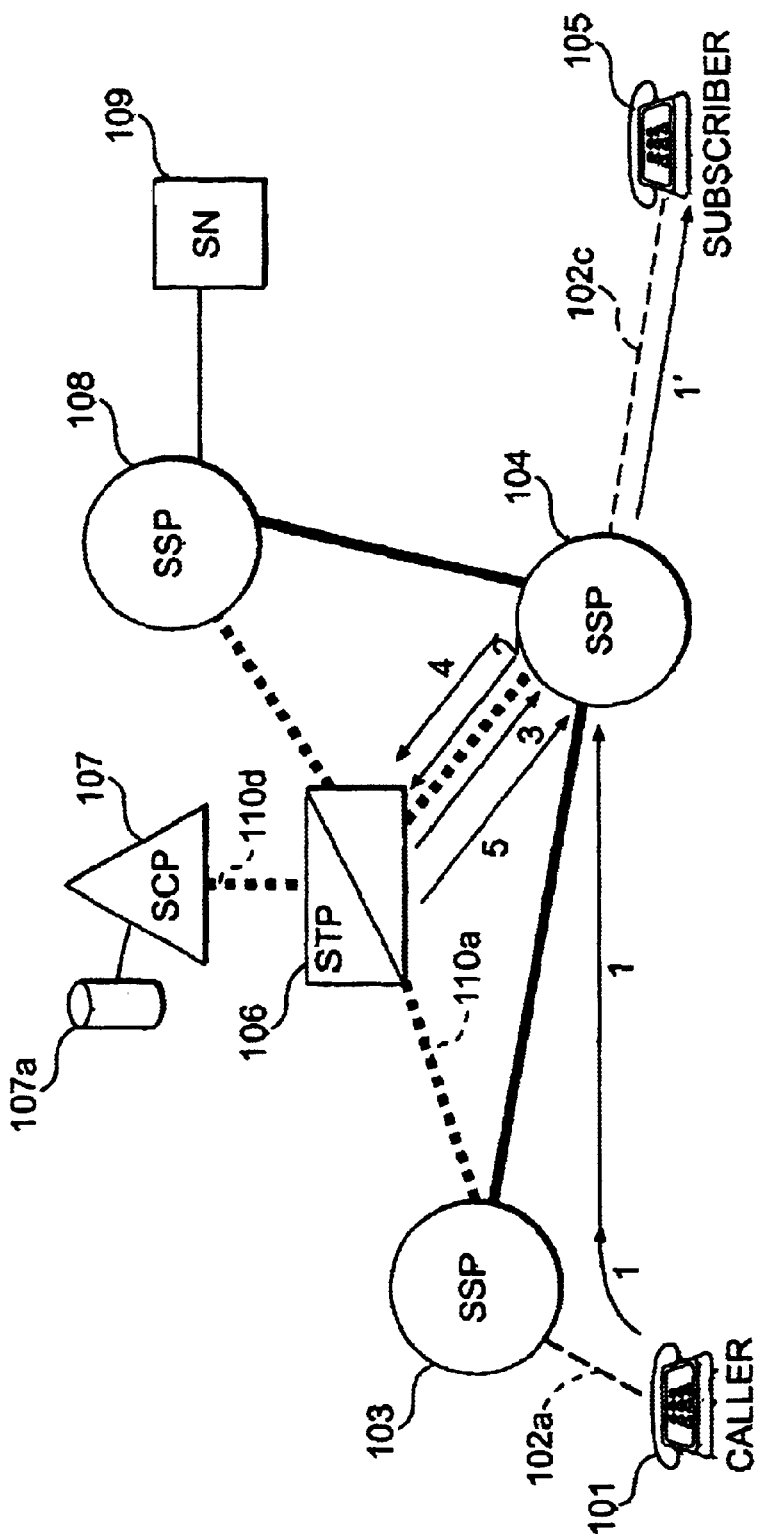
FIG. 3 is a schematic diagram of a second embodiment of the present invention, in which a caller from a private or unknown number bypasses a subscriber's privacy screening using a bypass code.
Figure 6:
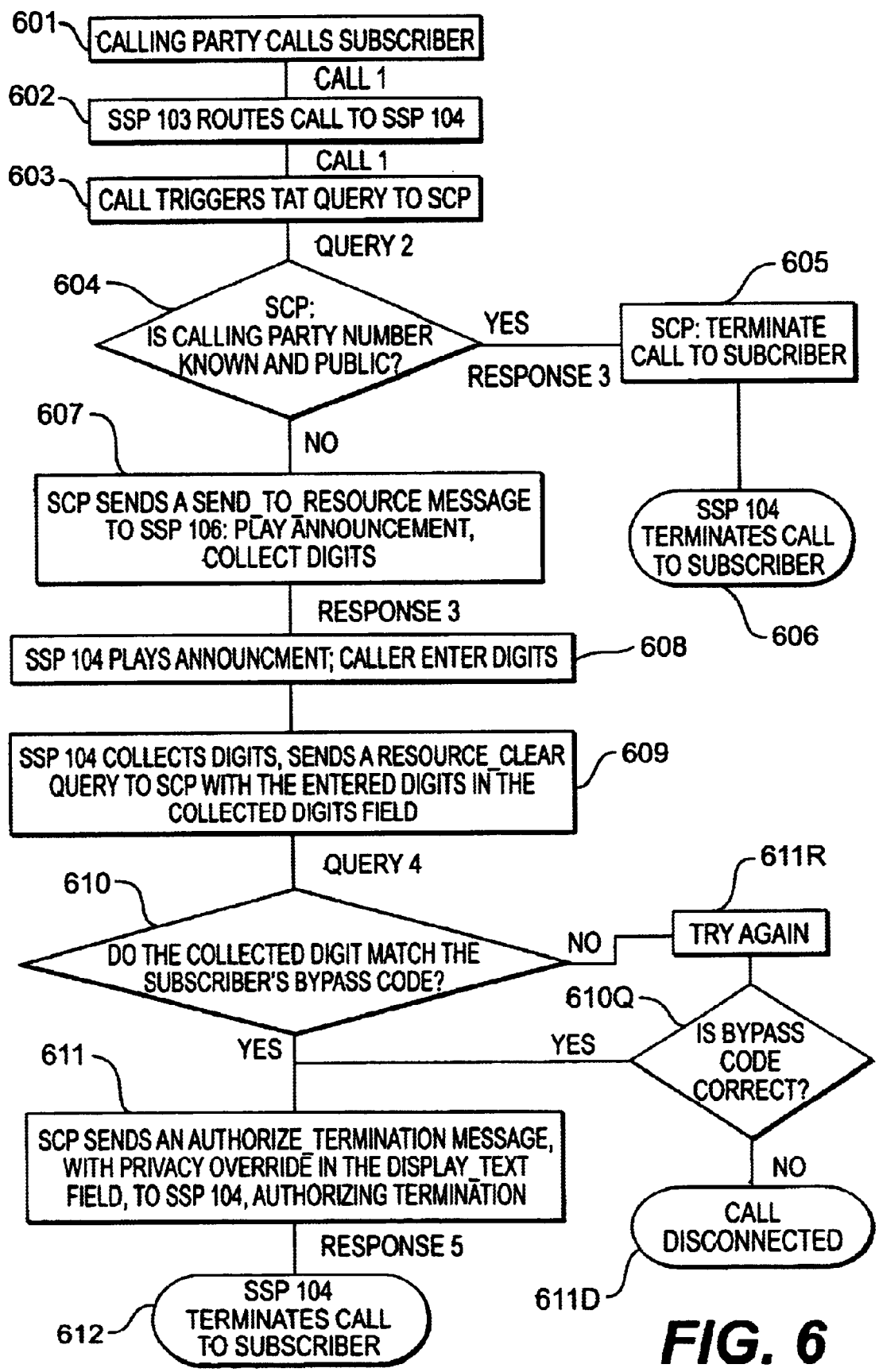
FIG. 6 is a flow chart showing the call flows of the second embodiment of the present invention.

FIG. 6 is a flow chart outlining the second preferred embodiment of the present invention, showing the call flows when a calling party calls a subscriber to a privacy screening service, and the subscriber has provided the calling party with a bypass code. The call flows listed in FIG. 6 are the call flows identified in FIG. 3. This embodiment uses the subscriber's SSP to conduct the dialog with the caller. In step 601, the calling party dials the subscriber's telephone number. The call (call 1) goes to the calling party's switch, SSP 103. In step 602, SSP 103 routes the call to the subscriber's switch, SSP 104. Because the subscriber has subscribed to a privacy screening service, in step 603 the call triggers a TAT query (query 2) from SSP 104 to SCP 107, asking for authorization to terminate the call. In step 604, SCP 107 checks the presentation indicator in the calling party number field of the query. If the calling party's number is known and public, in step 605 SCP 107 instructs SSP 104 to terminate the call to the subscriber and provides SSP 104 with the number and name of the calling party (response 3). In step 606 the call goes through to the subscriber, and the subscriber is provided the number and name of the calling party. The subscriber can then choose to accept or reject the call.

If the calling party's number is private or unknown, in step 607 SCP 107 sends a Send_to_Resource message (response 3) to SSP 104, instructing SSP 104 to play an announcement to the calling party, asking the calling party to record his or her number, and also instructing SSP 104 to collect any digits entered by the caller during the announcement. (The Send_to_Resource message includes a parameter that can be set to instruct the SSP to collect a specified number of digits.) In step 608, the caller enters the digits representing his or her bypass code while SSP 104 plays the announcement. In step 609, SSP 104 collects the digits entered by the caller, and sends the digits to SCP 107 in the collected digits field of a Resource_Clear query (query 4). In step 610, SCP 107 compares the digits in the collected digits field to the bypass code corresponding to the subscriber number in its database 107a, and determines whether the entered digits match the bypass code. If the digits match, in step 611 SCP 107 sends an Authorize_Termination message (response 5) authorizing termination of the call from SSP 104 to the subscriber. SCP 107 also populates the display text field of the Authorize_Termination message with "PRIVACY OVERRIDE." In step 612, the call is terminated. If the digits do not match, the caller is given a second chance to enter the correct bypass code in step 611R. In step 611Q, SCP 107 again determines whether the correct bypass code was entered. If the correct bypass code was not entered with the second attempt, the call is disconnected in step 611D.

Figure 3A:
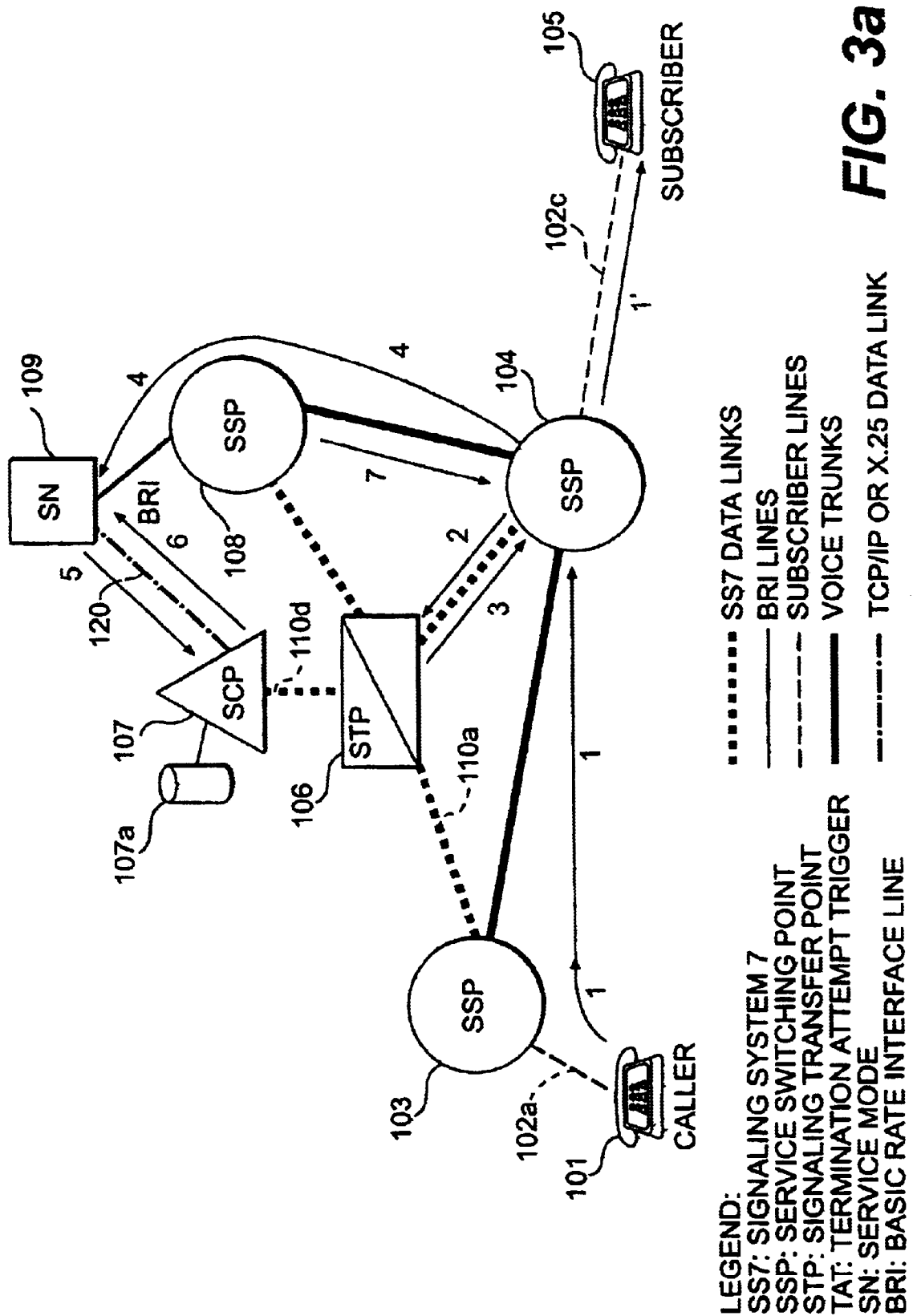
FIG. 3a is a schematic diagram of a third embodiment of the present invention, in which a caller bypasses a subscriber's privacy screening using a bypass code.

A third embodiment of the present invention, for allowing a caller from a private or unknown telephone to enter a pass code to bypass privacy screening will be described with reference to FIGS. 6a–6d. The call flows listed in FIGS. 6a–6d are the call flows identified in FIG. 3a. The call sequence will be described first for calls from private numbers (FIGS. 6a–6b) and then for calls from unknown numbers (FIGS. 6c–6d).

Figure 6A:
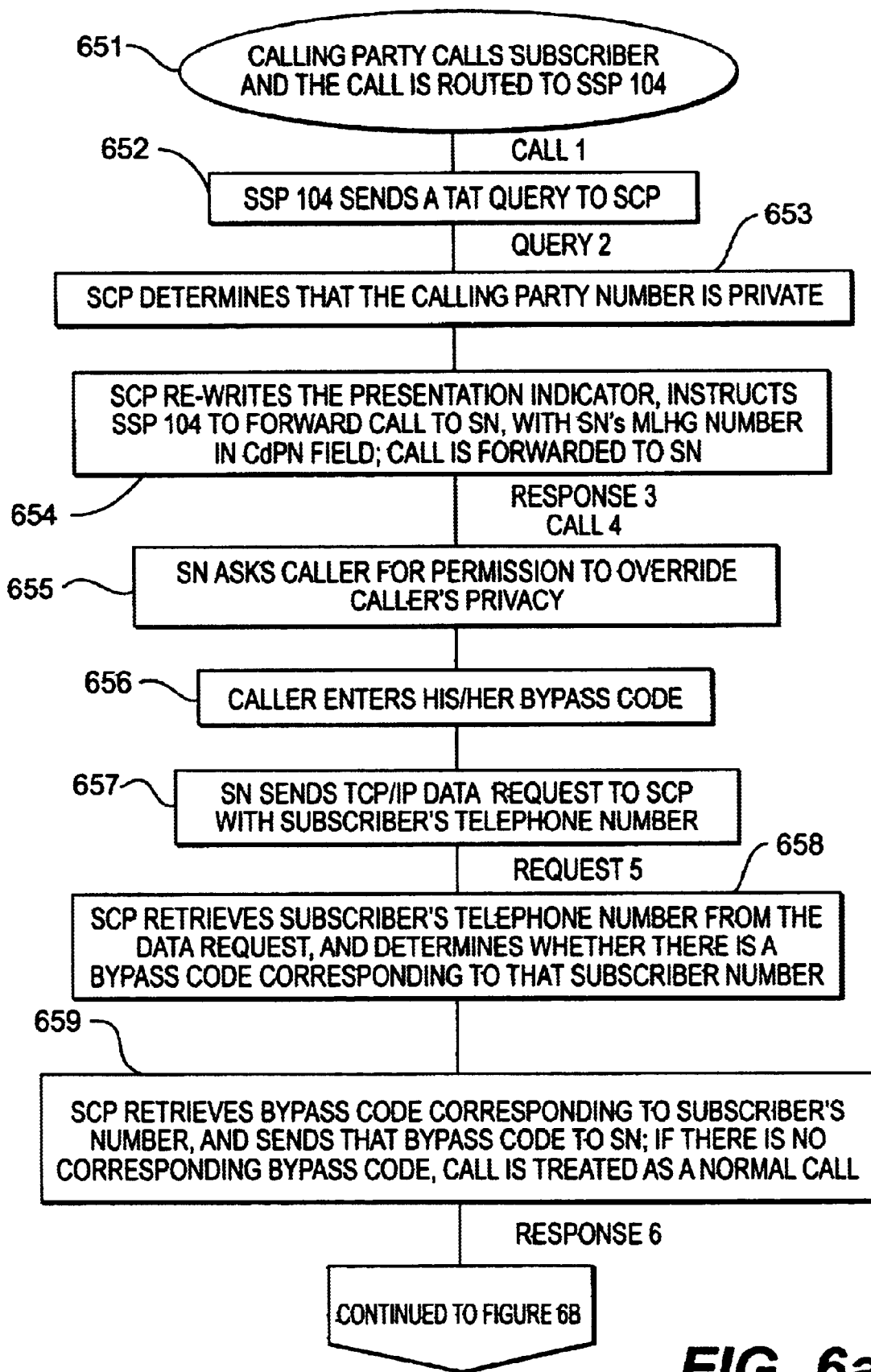
FIGS. 6a–6b are a flow chart showing the call flows of the third embodiment of the present invention, when the caller is calling from a private number.
Figure 6B:
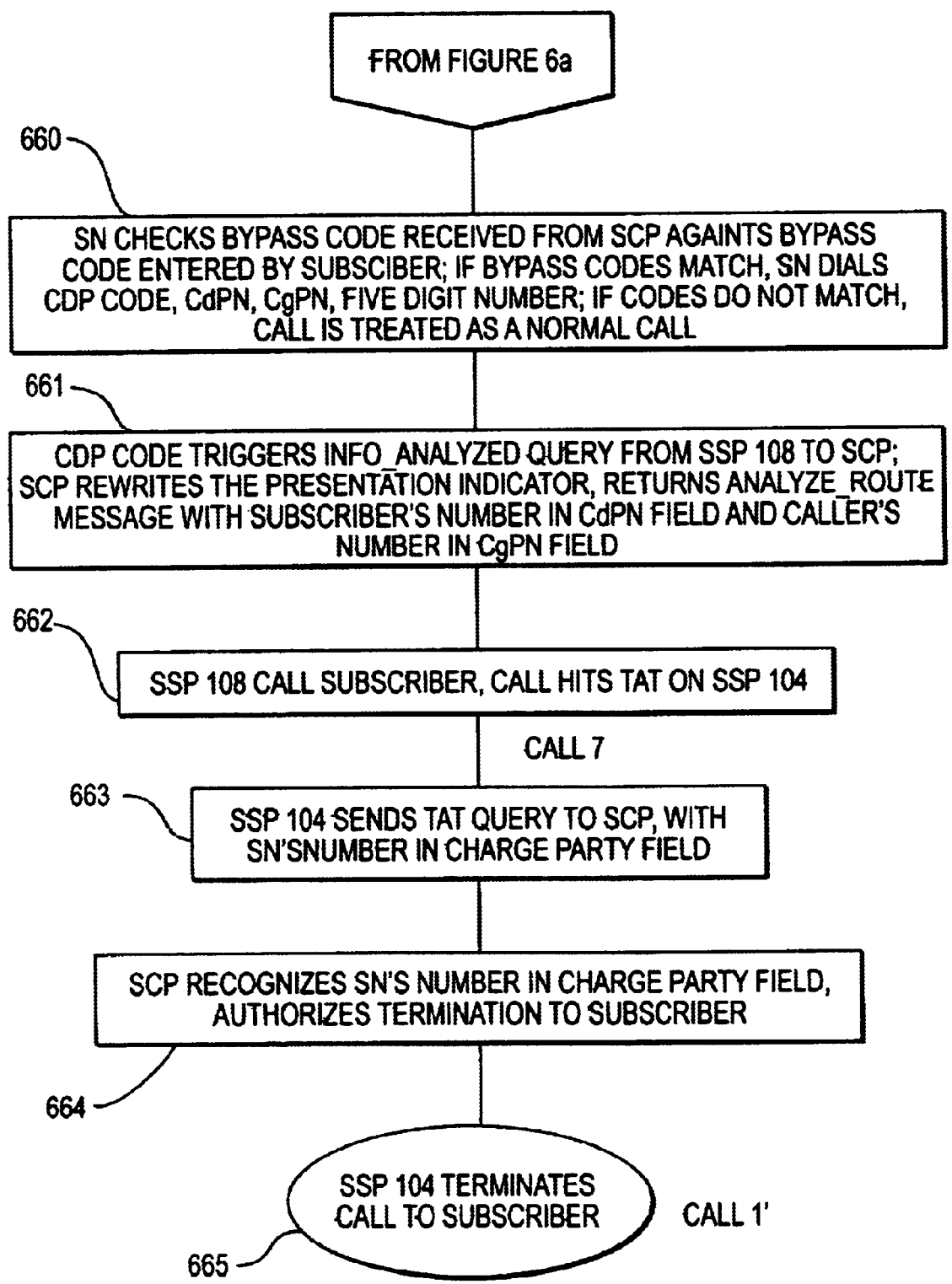
Figure 6C:
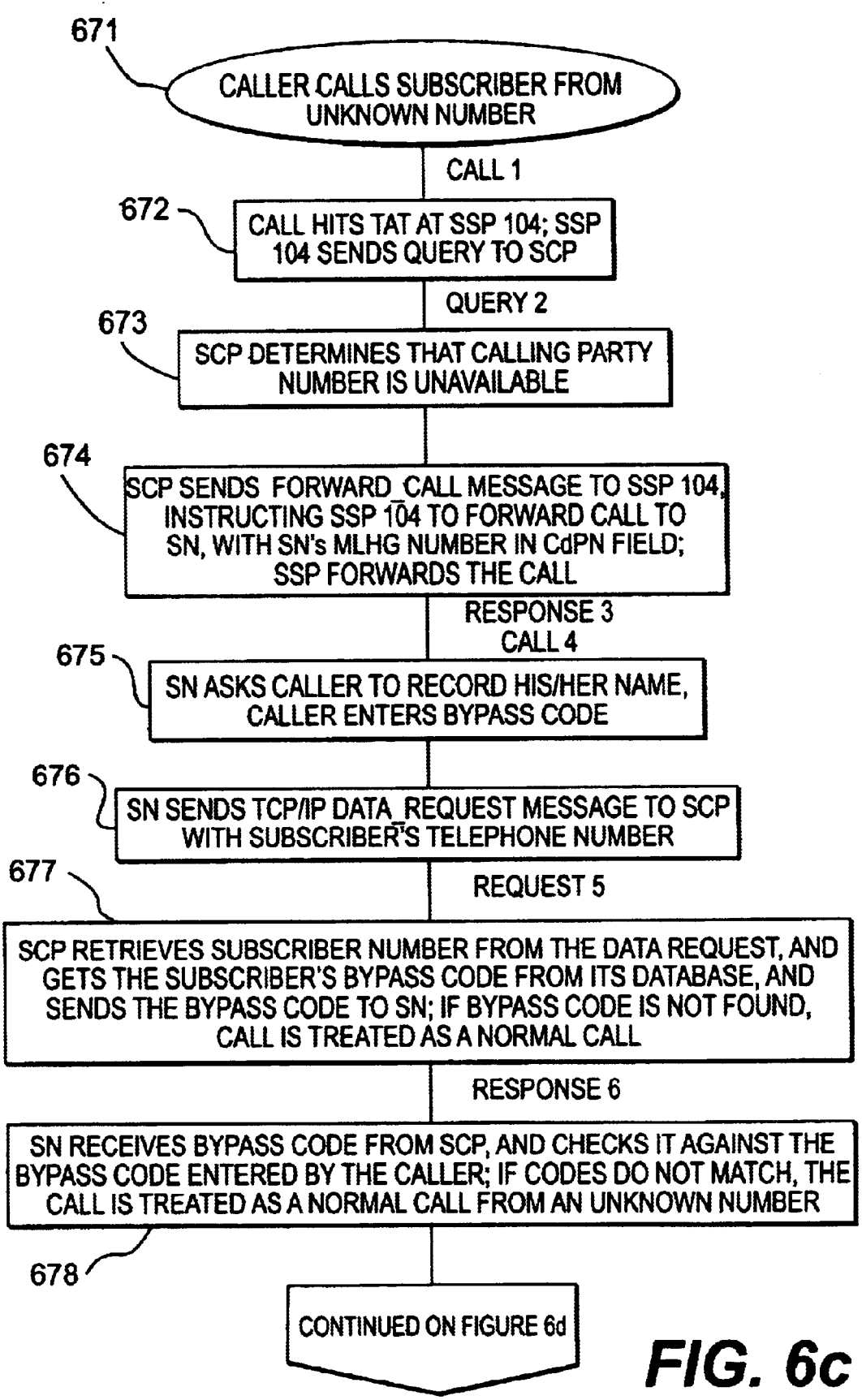
FIGS. 6c–6d are a flow chart showing the call flows of the third embodiment of the present invention, when the caller is calling from an unknown number.
Figure 6D:
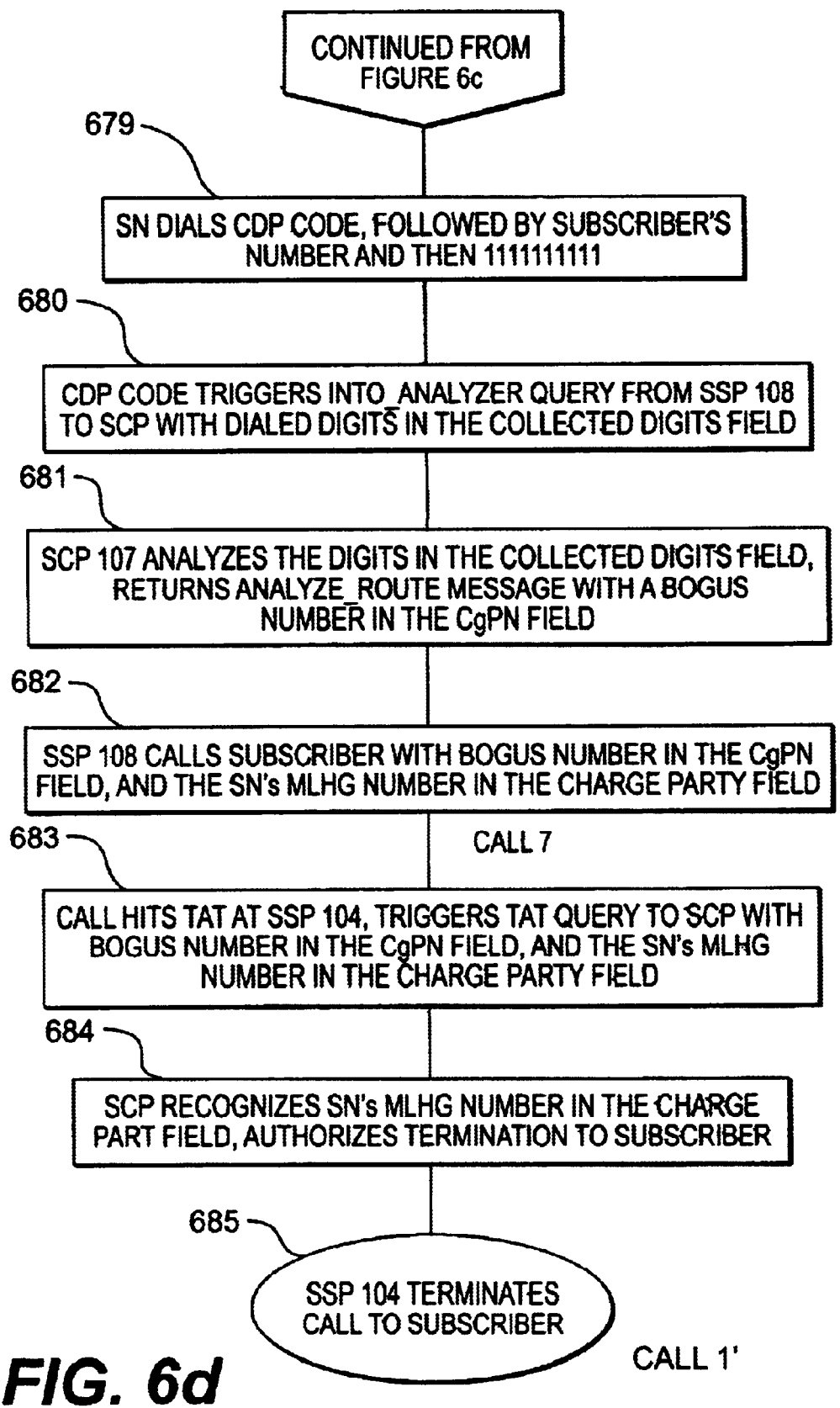

As shown in FIG. 6a, in step 651 a calling party dials the subscriber's telephone number, and the call (call 1) is routed from the calling party's SSP 103 to the subscriber's SSP 104. Because a termination attempt trigger is provisioned on the subscriber's SSP 104 for the subscriber's telephone number, in step 652 a termination attempt query (query 2) is sent to SCP 107 with the calling party number in the CgPN field, the subscriber's number in the CdPN field, and the calling party number in the charge number field. In step 653, SCP 107 checks the presentation indicator on the calling party number, and discovers that the indicator is "Presentation Restricted."

In step 654, since the number is private, SCP 107 re-writes the presentation indicator as "Presentation Unrestricted", and sends a Forward_Call message (response 3) instructing SSP 104 to forward the call (call 4) to SN 109 with the SN's multi-line hunt group (MLHG) number in the CdPN field, and the calling party number in the CgPN field. (When it receives the call, SN 109 knows that the presentation indicator was originally restricted, because an unrestricted call would have been terminated to the subscriber, and would have never reached the SN.) In step 655, SN 109 then plays an announcement to the calling party, asking for permission to present the calling party's telephone number to the subscriber. In step 656, the calling party then enters a 4-digit pass code. In step 657, SN 109 sends a TCP/IP data request over data link 120 to SCP 107 (request 5), with the subscriber's telephone number.

In step 658, SCP 107 retrieves the subscriber's telephone number from the TCP/IP data request, and determines whether there is a bypass code corresponding to that number in its database. In step 659, SCP 107 retrieves the pass code corresponding to the subscriber's telephone number, and sends that pass code to SN 109 in a TCP/IP Data Response Success message over data link 120 (response 6). If SCP 107 does not have a bypass code corresponding to the subscriber's telephone number in its database, it sends a TCP/IP Data Response Fail message to SN 109.

If SCP 107 succeeds in receiving a bypass code and sending it to SN 109 as described above, in step 660 SN 109 checks the bypass code received from SCP 107 against the pass code entered by the calling party. If the bypass codes do not match, the call is treated as a normal call from a private telephone number.

If the bypass codes match, SN 109 dials a string starting with a CDP code, e.g., CDP code Y, followed by the 10-digit called party number (the subscriber's number), the 10-digit calling party number, and, e.g., a five digit string of 2's (22222). In step 661, the CDP code Y triggers an Info_Analyzed query at the SN's SSP 108 with the CDP code Y (*95) in the Access Code field, and the rest of the digits in the Collected Digits field. SCP 107 then analyzes the digits, re-writes the presentation indicator as "restricted' (private), and returns an Analyze_Route message with the subscriber's number as the CdPN, and the calling party number as the CgPN (with the presentation indicator set to "restricted"). In step 662, shown on FIG. 6b, SSP 108 calls the subscriber (call 7) with the subscriber's number in CdPN field, the calling party number in the CgPN field (with the presentation indicator set to "restricted" or private) and the charge number as the lead number for the SN's MLHG number. When the call reaches the subscriber's SSP 104, it hits the TAT provisioned on the subscriber's number at SSP 104. In step 663, SSP 104 then sends a termination attempt query to SCP 107 with calling party number as the CgPN (presentation indicator set to restricted), the subscriber number as the CdPN, and the SN's MLHG number in the charge number field. In step 664, SCP 107 recognizes the SN's MLHG number in the charge number field, and sends an Authorize_Termination message to SSP 104. This message includes the calling party number in the CgPN field (with the presentation indicator "restricted" or private). Finally, in step 665 SSP 104 terminates the call (call 1') to the subscriber, using the CNAME TR-1188 generic requirements.

As shown in FIG. 6c, when the call is from an unknown caller, the call (call 1) hits the termination attempt trigger provisioned on the subscriber's SSP 104 for the subscriber's telephone number, prompting the TAT query (query 2) to SCP 107. In response, SCP 107 determines that the calling party number is unavailable (steps 671–673 in FIG. 6c). In step 674, SCP 107 then sends a Forward_Call message (response 3) instructing SSP 104 to forward the call (call 4) to SN 109 with the SN's MLHG number in the CdPN field and the calling party number in the CgPN field (presentation indicator "unavailable"). In step 675, SN 109 checks that the presentation indicator is unavailable, and plays an announcement to the calling party, asking the calling party to record his or her name. If the caller enters a four-digit pass code, SN 109 sends a TCP/IP Data_Request message (request 5) over data link 120 to SCP 107 in step 676 with the subscriber's telephone number. SCP 107 responds to the data request message in step 677 by retrieving the subscriber's telephone number from the TCP/IP data request, and retrieving the pass code corresponding to the subscriber's telephone number from its database, and sending that pass code to SN 109 in a TCP/IP Data Response Success message (response 6) over data link 120. If SCP 107 cannot find a pass code corresponding to the subscriber's telephone number, it sends a TCP/IP Data Response Fail message to SN 109. In this case, the call is treated as a normal call from an unknown telephone number.

When it receives the TCP/IP Data Response Success message, SN 109 checks the pass code received from the SCP in step 678 against the pass code entered by the calling party. If the pass codes do not match, the call is treated as a normal call from an unknown telephone number.

If the pass codes match, in step 679 SN 109 then dials a CDP code Y, followed by the 10-digit called party number (the subscriber's number) and, e.g., a 10-digit string of 1's. This ensures that the call will be terminated to the subscriber without any privacy modifications. The call reaches SSP 108 and SN 109 drops out of the call. In step 680, the CDP code Y triggers an Info_Analyzed query to SCP 107, with Y (*95) as the Access Code and the rest of the dialed digits in the Collected Digits field. In step 681, SCP 107 analyzes the digits, and returns an Analyze_Route message with the subscriber's number as the CdPN, and a bogus number (i.e. a number that is not allowed by the telephone network) as the CgPN (with the presentation indicator set to "unavailable"). SSP 108 then calls the subscriber (call 7) in step 682 with the subscriber's number in CdPN field, the bogus number in the CgPN field (with the presentation indicator set to "unavailable") and the lead number for the SN's MLHG number in the charge number field. When the call reaches the subscriber's SSP 104, it hits the TAT provisioned on the subscriber's number at SSP 104. SSP 104 then sends a termination attempt query in step 683 to SCP 107 with bogus number as the CgPN (presentation indicator set to unavailable), the subscriber number as the CdPN, and the SN's MLHG number in the charge number field. In step 684, SCP 107 recognizes the SN's MLHG number in the charge number field, and sends an Authorize_Termination message to SSP 104 with the bogus number in the CgPN and the presentation indicator set to "unavailable". Finally, in step 685 SSP 104 terminates the call (call 1') to the subscriber, using the CNAME TR-1188 generic requirements.

Provisioning the Bypass Code and Password

Figure 7A:
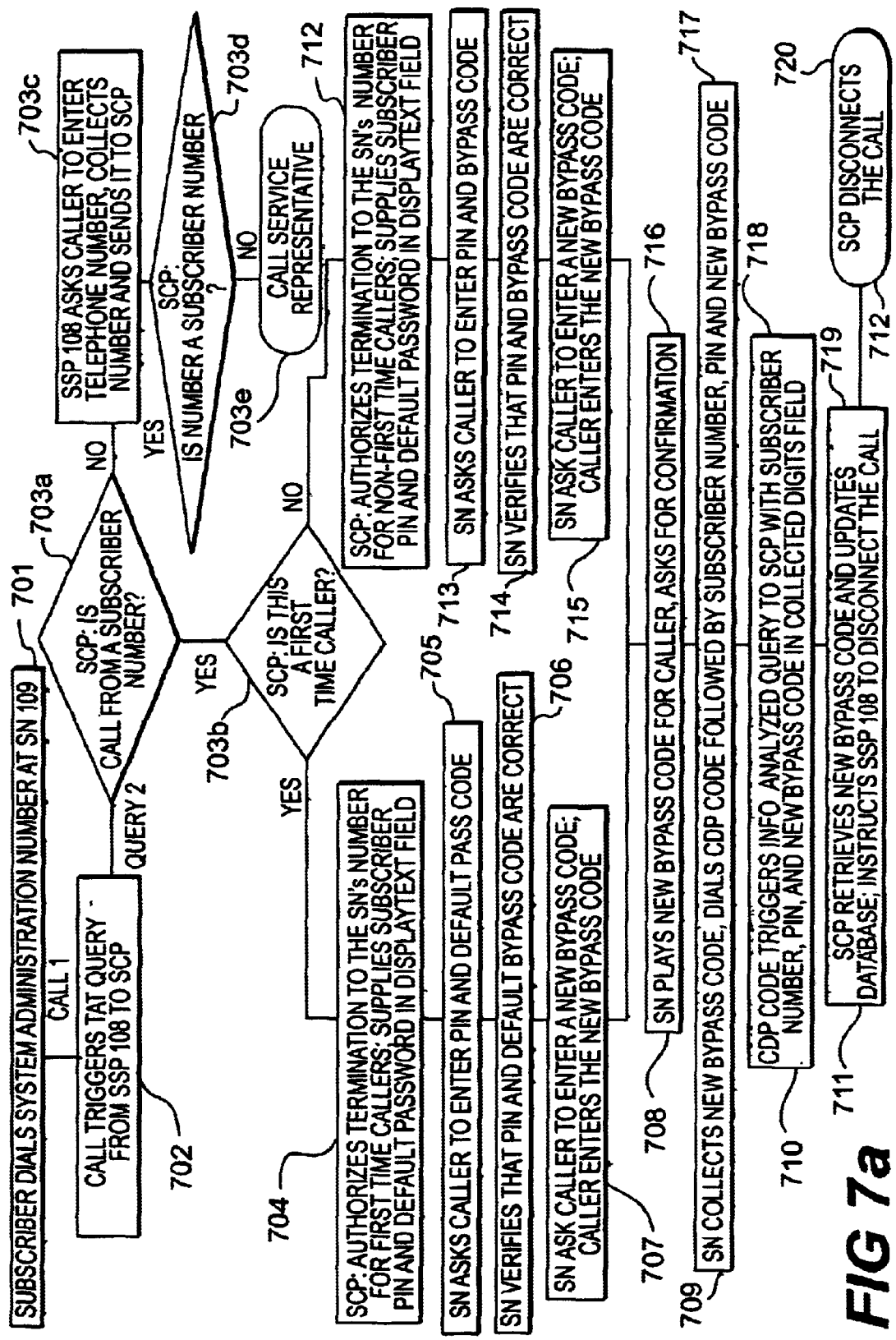
FIG. 7a is a flow chart showing the call flows for a first preferred embodiment for allowing a subscriber to change his or her bypass code.

FIG. 7a is a flow chart of a first preferred embodiment for allowing a subscriber to change his or her bypass code. The call flows listed in FIG. 7 are the call flows identified in FIG. 4a. In step 701, the subscriber dials a system administration number at the service node. The call is routed to the service node's service switching point, SSP 108. When the call reaches SSP 108, in step 702 the call triggers a termination attempt trigger provisioned on that system administration number at SSP 108, prompting a query (with the calling party number in the calling party field) from SSP 108 to SCP 107 via STP 106. In step 703a, SCP 107 checks its database 107a to determine whether the subscriber is calling from the subscriber number. If the call is from a subscriber number, in step 703b, SCP 107 checks the "first caller" flag and determines whether the caller is calling for the first time.

If the call is not from a subscriber number, optionally SCP 107 may send a Send_To_Resource message to SSP 108, asking SSP 108 to play an announcement to the caller, asking the caller to enter the subscriber's telephone number whose bypass code the caller wishes to change (step 703c). SSP 108 then collects the telephone number from the caller, and sends it to SCP 107 which checks the collected number against its database (step 703d). If the number does not match, SCP 107 instructs SP 108 to play an announcement to the caller, asking the caller to contact a service representative (step 703e). If the number does match, then the call flow continues with step 703b.

Alternatively, only callers calling from the subscriber number may be allowed to change the bypass code. In that case, instead of steps 703c–703e, SCP 107 responds to query 2 with a Send_To_Resource message instructing SSP 108 to, e.g., ask the caller to contact a service representative or inform the caller that this service will only respond to calls made from subscribers' telephones.

If SCP 107 determines that the caller is calling from a subscriber number and that the subscriber is a first-time caller, in step 704 SCP 107 sends an authorize termination message, to the system administration number at SN 109 for first-time callers. SCP 107 also sends the password and default bypass code numbers to the SN in the Display_Text field. In step 705, SN 109 asks the caller to enter his or her password and the default bypass code. In step 706, SN 109 verifies that the password and default bypass code are correct. If the password and default bypass code are correct, in step 707 SN 109 asks the subscriber to enter a new bypass code, and the caller enters the new bypass code. In step 708, SN 109 plays the new bypass code to the caller, and asks the caller to confirm that the bypass code is correct. In step 709, SN 109 collects the new bypass code, and dials a CDP code followed by the subscriber number, the password and the new bypass code. In step 710, the CDP code triggers an Info_Analyzed query from SSP 108 to SCP 107, with the subscriber number, the password and the new bypass code in the collected digits field of the query. In step 711, SCP 107 retrieves the new bypass code from the collected digits field, and updates database 107a with the new bypass code. It also instructs SSP 108 to disconnect the call. In step 712, SSP 108 disconnects the call.

If in step 703b SCP 107 determines that the first-time caller flag is not on, in step 712 SCP 107 authorizes termination of the call to a different system administration number at SN 109 with an Authorize_Termination message. The response includes the subscriber's password and bypass code in its Display Text field. In step 713, SN 109 asks the caller to enter his or her password and his or her bypass code. In step 714, SN 109 compares the collected password and bypass code entered by the caller to the password and bypass code received from SCP 107, and determines if there is a match. If the numbers match, in step 715 SN 109 prompts the caller to enter the new code. In step 716, SN 109 plays the new code and asks for the caller to confirm that the new code is correct. In step 717 SN 109 collects the new code, and dials a CDP code, e.g., *99, followed by the subscriber number, the changed bypass code and the subscriber's password. In step 718, the CDP code triggers an Info_Analyzed query from SSP 108 to SCP 107, with the subscriber number, changed bypass code, and password in the collected digits field of the query. In step 719, SCP 107 retrieves the new bypass code from the collected digits field, updates the bypass code in its database 107a and instructs SSP 108 to disconnect the call. In step 720, SSP 108 disconnects the call.

As is evident in FIG. 7a, the call flow for the first-time caller and the non-first-time callers is the same once SN 109 retrieves a new bypass code in step 707 (first-time caller) or in step 715 (non-first-time caller). Thus steps 708-712 for the first-time caller are identical to steps 716–720 for the non-first-time caller, as shown in FIG. 7a.

In one embodiment of the invention, if in step 703a SCP 107 determines that the caller is not calling from a subscriber number, the call is disconnected (preferably after playing an announcement to the calling party saying that he or she must call from his or her own telephone to change the bypass code).

Figure 4B:
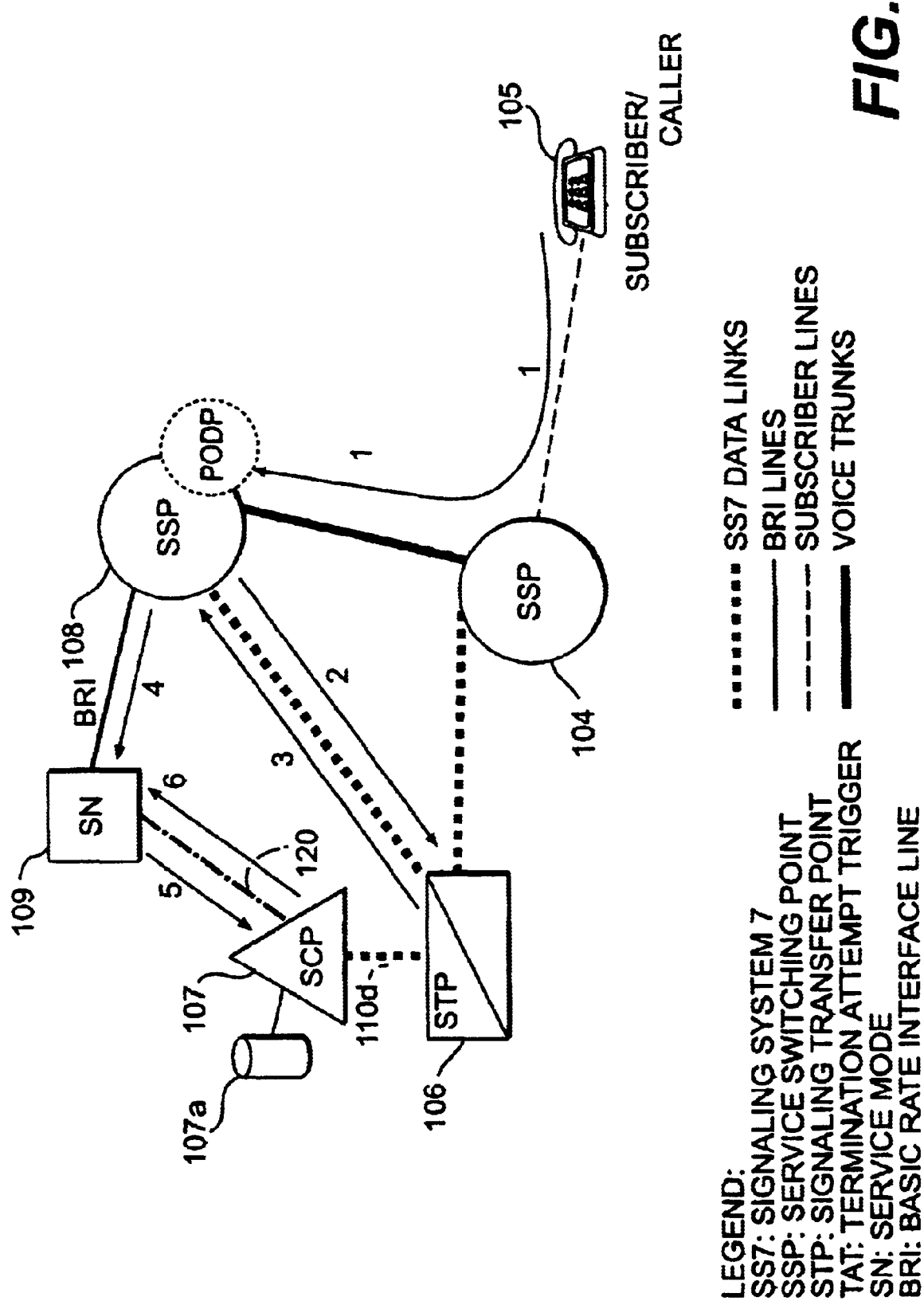
FIG. 4b is a schematic diagram showing the routing of calls of a second preferred embodiment for allowing a subscriber to change his or her bypass code.
Figure 7B:
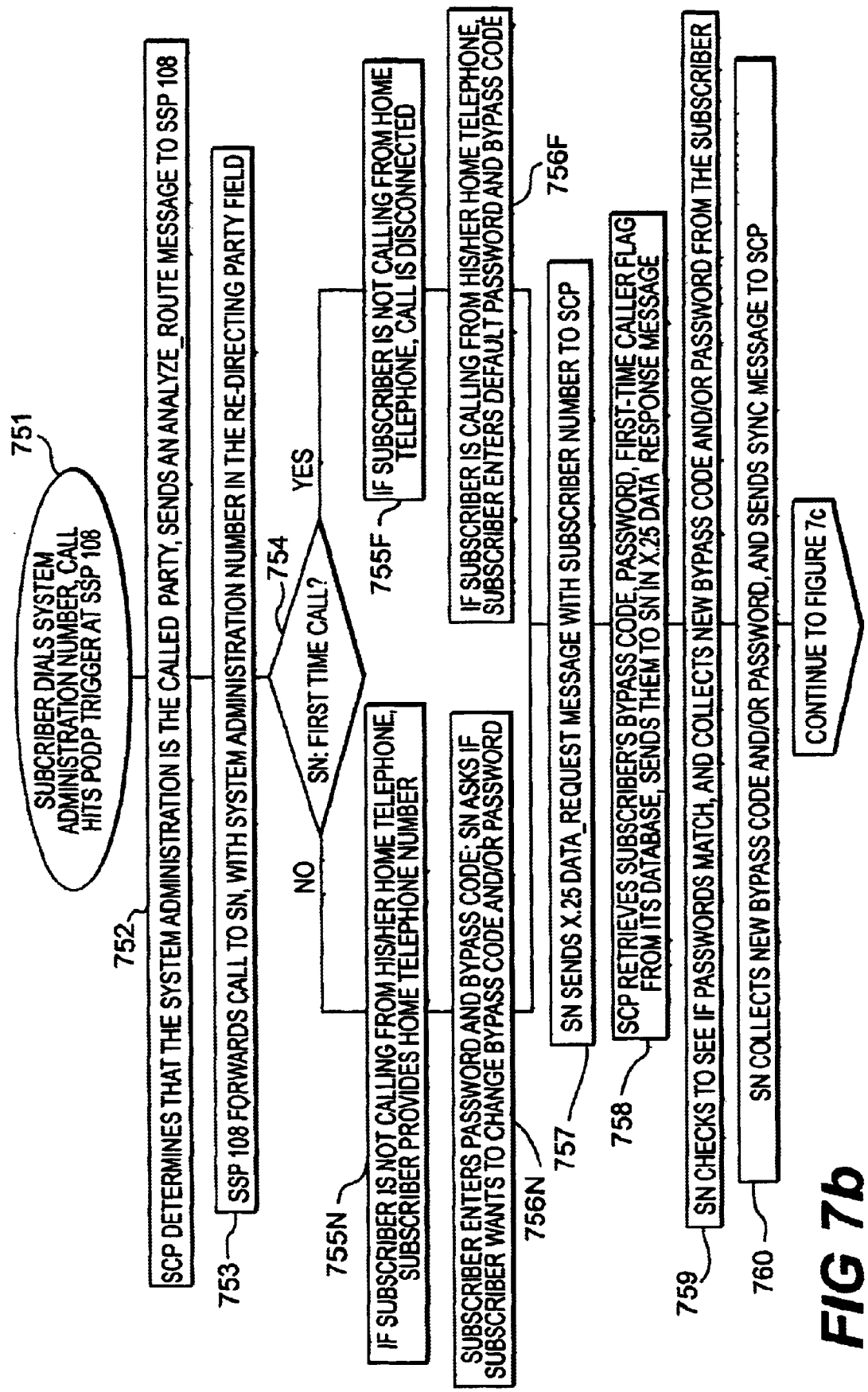
FIGS. 7b–7c are a flow chart showing the call flows for a second preferred embodiment for allowing a subscriber to change his or her bypass code.
Figure 7C:
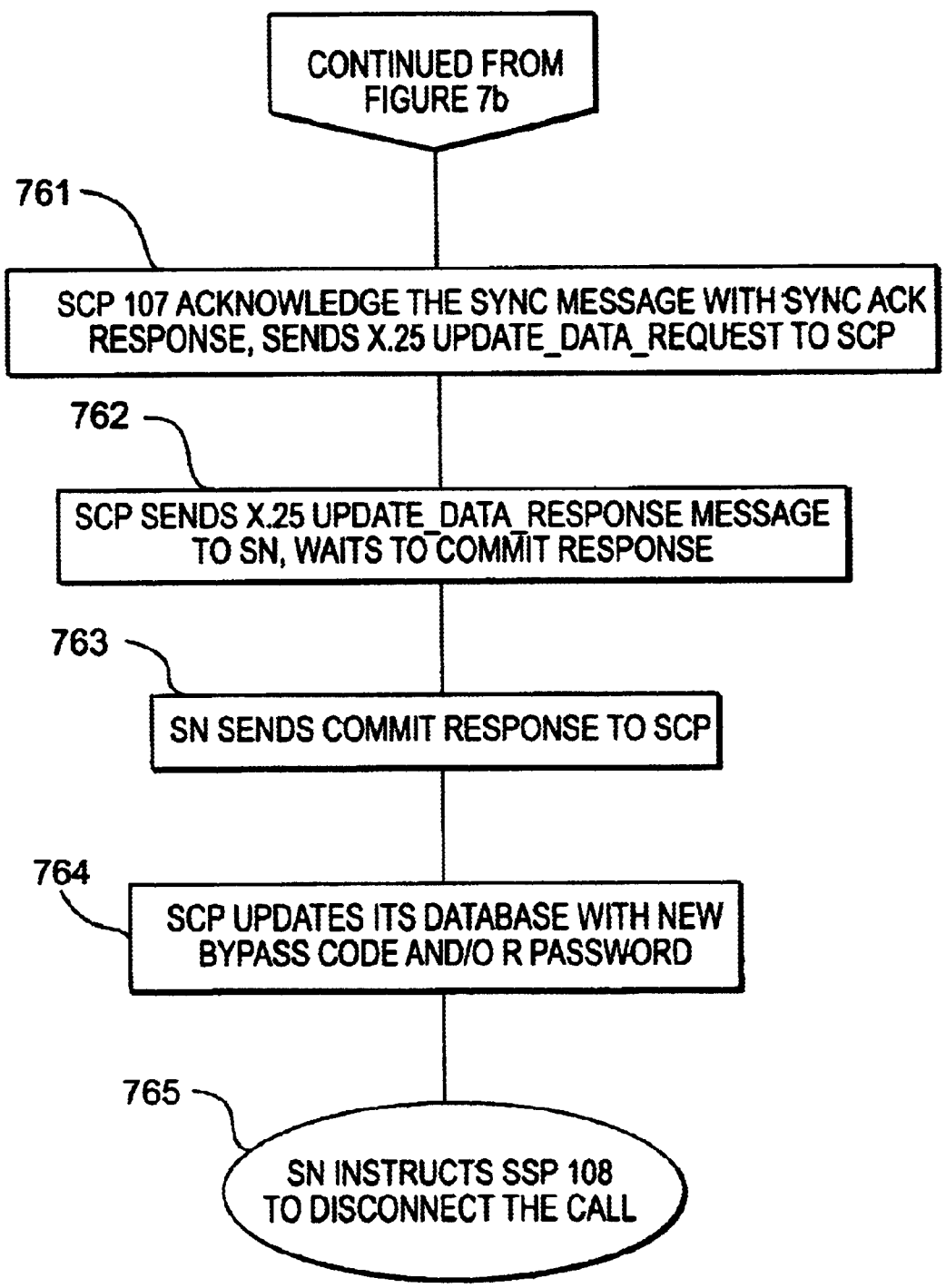

FIGS. 7b–7c are a flow chart of a second preferred embodiment for allowing a subscriber to change his or her bypass code. The call flows listed in FIGS. 7b–7c are the call flows identified in FIG. 4b. In step 751, shown in FIG. 7b, the subscriber dials a system administration number at the service node, and the call (call 1 in FIG. 4b) reaches the SSP serving the system administration, SSP 108. As shown in FIG. 4b, there is a PODP trigger provisioned on the system administration number at SSP 108. This PODP trigger prompts an Info_Analyze query (query 2 in FIG. 4b) to SCP 107 via STP 106 with the subscriber's number in the CgPN field, the system's administration number in the CdPN field, and the subscriber's number in the Charge Number field. In step 752, the privacy director's service package application (SPA) at SCP 107 checks its database and determines that the called party number is the number for the system administration. It then sends an Analyze_Route response to SSP 108 with the subscriber's number in the CgPN field, and the MLHG number of the SN that hosts the administration SPA (in this example, SN 109) in the CdPN field.

In step 753, SSP 108 puts the system administration number in the Re-Directing Party Number field, and forwards the call to SN 109. In step 754, SN 109 retrieves the subscriber's number from the CgPN field, and checks whether the subscriber is calling for the first time. In step 755F, if the subscriber is calling for the first time, but is not calling from his or her home telephone, SN 109 plays an announcement and the call is disconnected. If the subscriber is not a first-time caller, in step 755N the subscriber is asked if he or she is calling from his or her home telephone. If the subscriber is not calling from his or her home telephone, the subscriber is asked to enter his or her home telephone number. In step 756F, if the subscriber is calling from his or her home telephone, the subscriber enters a default bypass code and password previously provided by the system. In step 756N, the subscriber enters the password and bypass code, and SN 109 then asks the subscriber if he or she wants to change his or her bypass code and/or password. In step 757, SN 109 then sends an X.25 Data_Request message to SCP 107, with the subscriber's number retrieved from the CgPN field.

In step 758, SCP 107 checks its subscriber database, based on the subscriber's number, and retrieves bypass code, password and first-time caller flag data for that subscriber. It then populates the bypass code field, password field, and subscriber first-time caller flag fields of an X.25 Data_Response message with the data it retrieved from its subscriber database back to SN 109. In step 759, SN 109 collects the password from the subscriber, and checks to see if it matches the password received from SCP 107, and, if the passwords match, collects a new bypass code from the subscriber. If the passwords do not match, SN 109 plays an error announcement to the subscriber, and allows the subscriber to enter the correct password. For example, the subscriber may be allowed two attempts to enter the correct password. If the subscriber cannot enter the correct password, SN 109 plays another announcement and disconnects the call. If the subscriber enters the correct password, in step 760, SN 109 collects the new bypass code and/or password from the subscriber and sends a SYNC message to SCP. In step 761, shown in FIG. 7c, SCP 107 acknowledges the SYNC message with a SYNC ACK response, and then sends an X.25 Update_Data_Request message to SCP 107. In step 762, SCP 107 sends an X.25 Update_Data_Response message back to SN 109, and waits until it receives a COMMIT response from SN 109. In step 763, SN sends the COMMIT response back to SCP 107. In step 764, SCP 107 updates its database 107a with the new bypass code and/or password. In step 765, SN 109 then instructs SSP 108 to disconnect the call.

Optionally, in this embodiment, the SN may allow the subscriber to turn the bypass code service ON or OFF. To implement this option, the SCP database additionally includes a flag representing the status of the bypass code service, and the SCP checks this flag when a caller enters a bypass code. The subscriber can turn the flag ON or OFF using the procedures described above for changing the bypass code (except that the subscriber changes the status of the bypass service).

As described in the Background section, AIN networks generally use redundant pairs of SCPs. Preferably, SN 109 must successfully exchange SYNC and COMMIT messages with both SCPs in a redundant SCP pair before updating its database with the new bypass code and/or password.

The foregoing disclosure of embodiments of the present invention has been presented for purposes of illustration and description. It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

What we claim is:

1. A privacy screening service in an advanced intelligent network having a service control point and a service switching point in communication with a service node, comprising a first service package application on service control point and a second service package application on the service node, wherein:

the first service package application re-directs a telephone call from a caller to a subscriber's telephone number to the service node;

the second service package application at the service node sends a data request comprising the subscriber's telephone number to the first service package application at the service control point;

the first service package application responds to the data request by retrieving a bypass code corresponding to the subscriber's telephone number, and sending that bypass code to the second service package application;

the second service package application compares the bypass code received from the first service package application to a bypass code entered by the caller and, if the two bypass codes match, the second service package application dials a string of digits starting with a customized dialing plan code that triggers a query to the first service package application; and the first service package application returns a response with a lead number for the service node as the charge number, and the call is routed to the subscriber's telephone number.

2. The privacy screening service of claim 1, wherein the service node and the service control point are in communication with each other over a data link.

3. The privacy screening service of claim 2, wherein the data link is a TCP/IP data link.

4. The privacy screening service of claim 2, wherein the data link is an X.25 data link.

5. The privacy screening service of claim 1, wherein subscribers can provision their bypass codes by calling a system administration number, and wherein a public office dialing plan trigger is provisioned on the system administration number such that the second service package application can obtain subscriber data from the first service package application.

6. The privacy screening service of claim 1, wherein, when the caller is an unknown caller, the string of digits also comprises a bogus number.

* * * * *